US007337412B2

(12) United States Patent
Guido et al.

(10) Patent No.: US 7,337,412 B2
(45) Date of Patent: Feb. 26, 2008

(54) METHODS, SYSTEMS AND COMPUTER PROGRAM PRODUCTS FOR PROVIDING MULTI-DIMENSIONAL TREE DIAGRAM GRAPHICAL USER INTERFACES

(75) Inventors: Patrick Rocco Guido, Cary, NC (US); Robert Charles Leah, Cary, NC (US); Paul Franklin McMahan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 10/735,966

(22) Filed: Dec. 15, 2003

(65) Prior Publication Data
US 2005/0149873 A1 Jul. 7, 2005

(51) Int. Cl.
*G06F 13/00* (2006.01)
*G06F 15/00* (2006.01)
(52) U.S. Cl. ...................................... 715/853; 715/835
(58) Field of Classification Search ................ 715/769, 715/853, 835, 840, 767, 855, 854
See application file for complete search history.

(56) References Cited

U.S. PATENT DOCUMENTS

| 5,923,328 A | * | 7/1999 | Griesmer .................... 715/854 |
| 5,978,790 A | * | 11/1999 | Buneman et al. ............... 707/2 |
| 6,348,935 B1 | * | 2/2002 | Malacinski et al. ......... 715/853 |
| 6,380,937 B1 | * | 4/2002 | Dong et al. ................. 345/440 |

* cited by examiner

*Primary Examiner*—Cao (Kevin) Nguyen
(74) *Attorney, Agent, or Firm*—David Irvin; Myers Bigel Sibley & Sajovec

(57) ABSTRACT

Methods, systems and computer program products for displaying a set of hierarchical data in a tree diagram are provided. One or more of the elements in the set of hierarchical data may include a set of embedded hierarchical data. The tree diagram includes at least two different parts, where the first part has a plurality of vertically oriented levels, and the second part has a plurality of horizontally oriented levels. The set of hierarchical data may be displayed in the first part of the tree diagram, and the set of embedded hierarchical data may be displayed in the second part of the tree diagram. One or more elements in the set of embedded hierarchical data may also include embedded hierarchical data. This doubly-embedded hierarchical data may be displayed in the first part of the tree diagram.

26 Claims, 9 Drawing Sheets

METHODS, SYSTEMS AND COMPUTER PROGRAM PRODUCTS FOR PROVIDING MULTI-DIMENSIONAL TREE DIAGRAM GRAPHICAL USER INTERFACES

FIELD OF THE INVENTION

The present invention relates generally to displaying hierarchical data on an electronic display or other display device. More particularly, the present invention relates to controlling the display of hierarchical data that is displayed on "tree diagram" graphical user interfaces.

BACKGROUND OF THE INVENTION

A wide variety of computer operating systems and computer application programs incorporate, display and/or perform operations on data or information that is hierarchical in nature. For example, most computer operating systems provide users access to a hierarchy of directories and/or sub-directories where documents, programs and/or other information are stored. Many computer e-mail systems likewise provide a hierarchy of files and/or sub-files in which e-mail messages may be stored. Organizer applications typically allow a user to establish task listings and/or store other forms of data which, once again, may be hierarchical in nature. The number and variety of computer systems and programs that store and/or manipulate hierarchical data sets continues to increase as computer processing applications proliferate.

With the advent and expanded use of graphical user interfaces over the last two decades, it has become possible to display all or part of hierarchical data sets to the user of a computer via a "tree diagram" representation. Tree diagrams are particularly useful in displaying hierarchical data as the levels of the tree diagram visually depict the location of each piece of data in a way that quickly and intuitively conveys to the user both the location of the data within the hierarchy and the relationship of that data to other data in the hierarchy. Additionally, the hierarchical structure of a tree diagram may allow the user to more quickly and efficiently peruse the data, such as by reviewing the entries at the higher levels to locate particular branches which are most likely to contain the information of interest. A user also typically can "expand" or "collapse" the tree diagram at various points (i.e., displaying or hiding information in the higher levels of the tree) to further facilitate viewing the hierarchical data. Both custom programs and tree diagram objects are known in the prior art for providing a tree diagram graphical user interface to a user. For example, FIG. 1 is a screen capture of a prior art application (Microsoft Corporation's Windows Explorer) that includes a display area containing hierarchical data displayed using a tree diagram graphical user interface.

SUMMARY OF THE INVENTION

Embodiments of the present invention provide for displaying a set of hierarchical data on an electronic display in a tree diagram. One or more of the elements in the set of hierarchical data may include a set of embedded hierarchical data. The tree diagram includes at least two different parts, where the first part has a plurality of vertically oriented levels, and the second part has a plurality of horizontally oriented levels. The set of hierarchical data may be displayed in the first part of the tree diagram, and the set of embedded hierarchical data may be displayed in the second part of the tree diagram. One or more elements in the set of embedded hierarchical data may also include embedded hierarchical data. This doubly-embedded hierarchical data may be displayed in a third part of the tree diagram.

In certain embodiments of the present invention, the second part of the tree diagram may be disposed between two adjacent levels of the plurality of vertically oriented levels. When one of the nodes included in one of the vertically oriented levels is expanded to display one or more of the nodes in one of the horizontally oriented levels, the vertically oriented levels that comprise higher levels in the tree diagram may be shifted laterally to accommodate display of the nodes in the horizontally oriented level. In other embodiments, the horizontally oriented levels may be aligned with the vertically oriented levels such that a first node of a horizontally oriented level will be aligned with a first of the vertically oriented levels and a second node of the horizontally oriented level that is adjacent to the first node will be aligned with a second of the plurality of vertically oriented levels that is adjacent to the first of the vertically oriented levels.

Expansion handle icons having a first configuration may be displayed adjacent one or more of the nodes in the first part of the tree diagram. Expansion handle icons having a different configuration may be displayed adjacent other of the other nodes in the first part of the tree diagram, such as nodes that include embedded hierarchical data. The tree diagram may also include a plurality of level indicators that denote respective of the plurality of vertically oriented levels. Likewise, the tree diagram may include a plurality of level indicators that denote respective of the plurality of horizontally oriented levels. The level indicators denoting the vertically oriented levels may be configured to look distinct from the level indicators denoting the horizontally oriented levels.

Further embodiments of the present invention provide for displaying on an electronic display a set of hierarchical data in which elements of the set of hierarchical data include embedded hierarchical data. At least part of the set of hierarchical data may be displayed in a first plurality of levels that have a first orientation. The hierarchical data that is embedded in elements of the set of hierarchical data may be displayed in a second plurality of levels that have a second orientation that is different than the first orientation. In certain embodiments of the invention, the first orientation is a vertical orientation and the second orientation is a horizontal orientation. A second set of hierarchical data that is embedded in an element of the embedded hierarchical data may also be displayed in one or more of the first plurality of levels.

Still other embodiments of the invention provide graphical user interfaces for displaying a set of hierarchical data in which elements of the set of hierarchical data include embedded hierarchical data. These graphical user interfaces may include a tree diagram that has a plurality of vertically oriented levels that include one or more nodes and a plurality of horizontally oriented levels that include one or more nodes. The plurality of horizontally oriented levels may branch out, directly or indirectly, from one or more of the nodes in the plurality of vertically oriented levels. The graphical user interface may also include a plurality of expansion handles that are associated with respective of the nodes in the plurality of vertically oriented levels and a plurality of expansion handles of a different type that are associated with respective of the nodes in the plurality of vertically oriented levels that contain one of the elements of the set of hierarchical data that includes embedded hierarchical data.

These graphical user interfaces may also include a group of level indicators that denote respective ones of the vertically oriented levels. They may further include a group of level indicators of a second type that are used to denote respective ones of the plurality of horizontally oriented levels. The two different types of level indicators may, for example, be different colored lines that connect the nodes in a specific level.

As will further be appreciated by those of skill in the art, the various embodiments of the present invention may be embodied as methods, apparatus, systems, graphical user interfaces and/or computer program products.

DETAILED DESCRIPTION OF THE INVENTION

Figure 1:
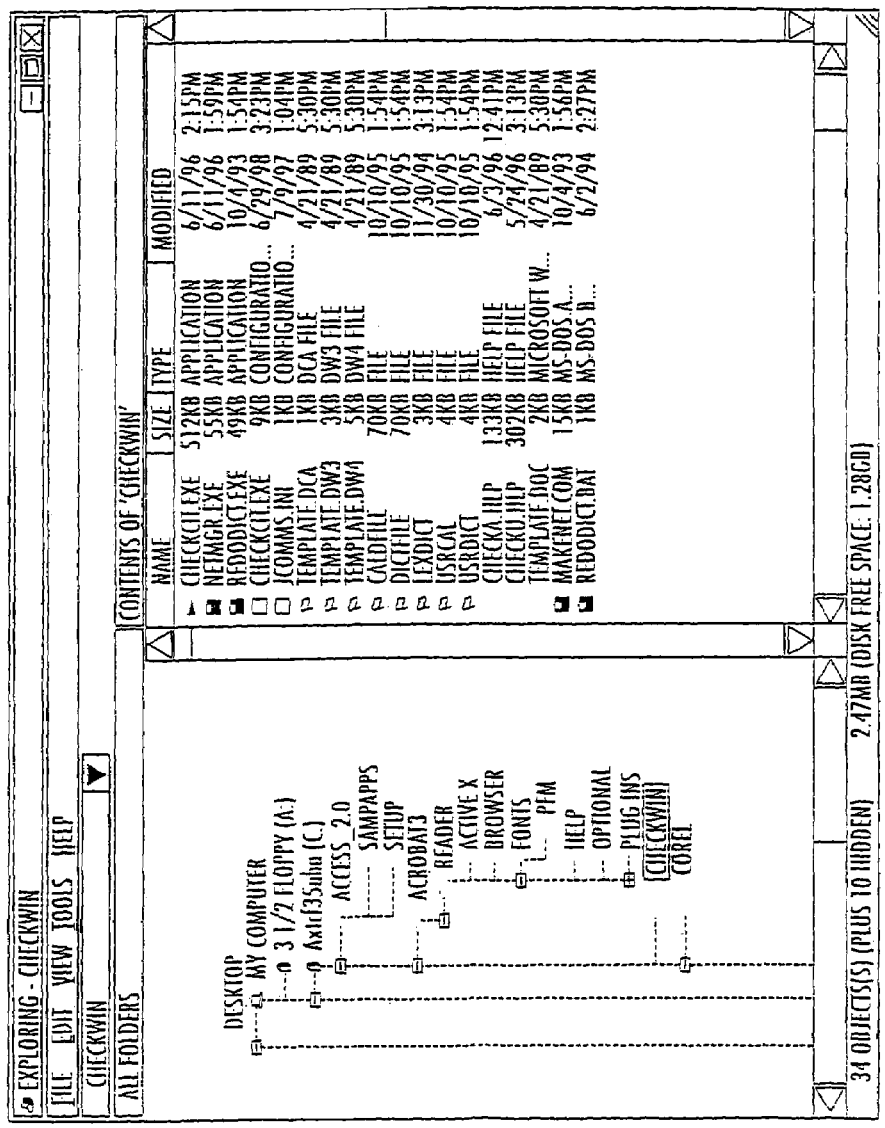
FIG. 1 is a screen capture of a conventional software program that provides a tree diagram graphical user interface.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, graphical user interface or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described in part below with reference to flowchart illustrations and/or block diagrams of methods, apparatus (systems) and computer program products according to embodiments of the invention. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Many current computer applications require the manipulation and/or display of hierarchical data sets. To facilitate manipulation and navigation of such data sets, the hierarchical data is often displayed to the user in tree diagram format. Conventional tree diagrams, however, typically are configured to display a single set of hierarchical data, and thus may not be suitable for displaying more complex hierarchical data sets.

Embodiments of the present invention provide for displaying a set of hierarchical data on an electronic display in which elements of the set of hierarchical data include embedded hierarchical data. By way of example, a file/ directory structure is a common type of hierarchical data set. Such a hierarchical data set may include zip files, e-mails with attachments or other elements that themselves contain a hierarchical file and/or directory structure. As another example, genealogical data (such as a family tree) is another type of hierarchical data set that can be conveniently displayed in a tree diagram. However, in certain applications, it may be desirable to include additional information in a genealogical data set, such as, for example, the health history of individuals included in the genealogical data set. Such a health history may itself comprise a hierarchical data set (e.g., the health history could be broken down by decades, by years within decades, etc. and/or the health history could be broken down by category of health issue and by separate incidents within each category, etc.). In situations where it is desired to display a hierarchical data set that has elements that include embedded hierarchical data, conventional tree diagrams may be inadequate for a variety of reasons.

Figure 2:
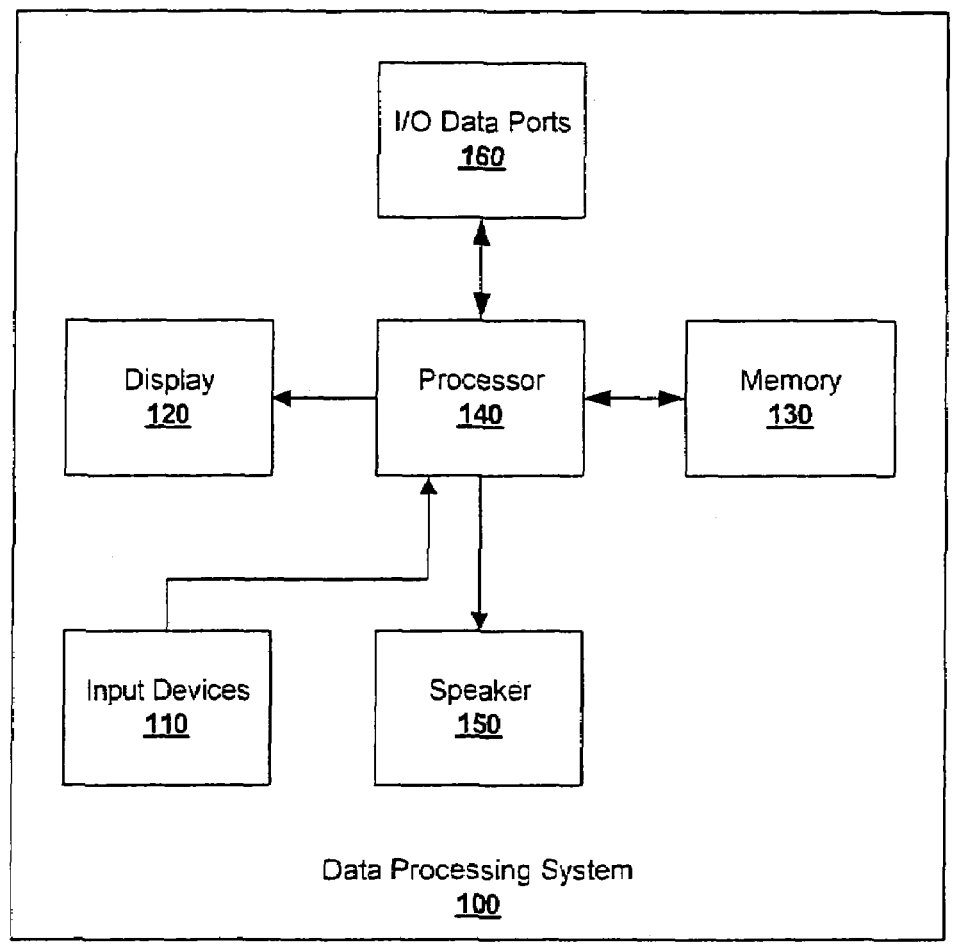
FIG. 2 is a block diagram of a data processing system suitable for use in some embodiments of the present invention.

Various embodiments of the present invention will now be described with reference to the figures. FIG. 2 illustrates an exemplary embodiment of a data processing system 100 suitable for use in implementing embodiments of the present invention. The data processing system 100 may include input device(s) 110 such as a keyboard, pointer, mouse and/or keypad, a display 120, and a memory 130 that communicates with a processor 140. The data processing system 100 may further include a speaker 150, and I/O data port(s) 160 that also communicate with the processor 140. The I/O data ports 160 can be used to transfer information between the data processing system 100 and another computer system or a network. These components may be conventional components, such as those used in many conventional data processing systems, which may be configured to operate as described herein.

Figure 3:
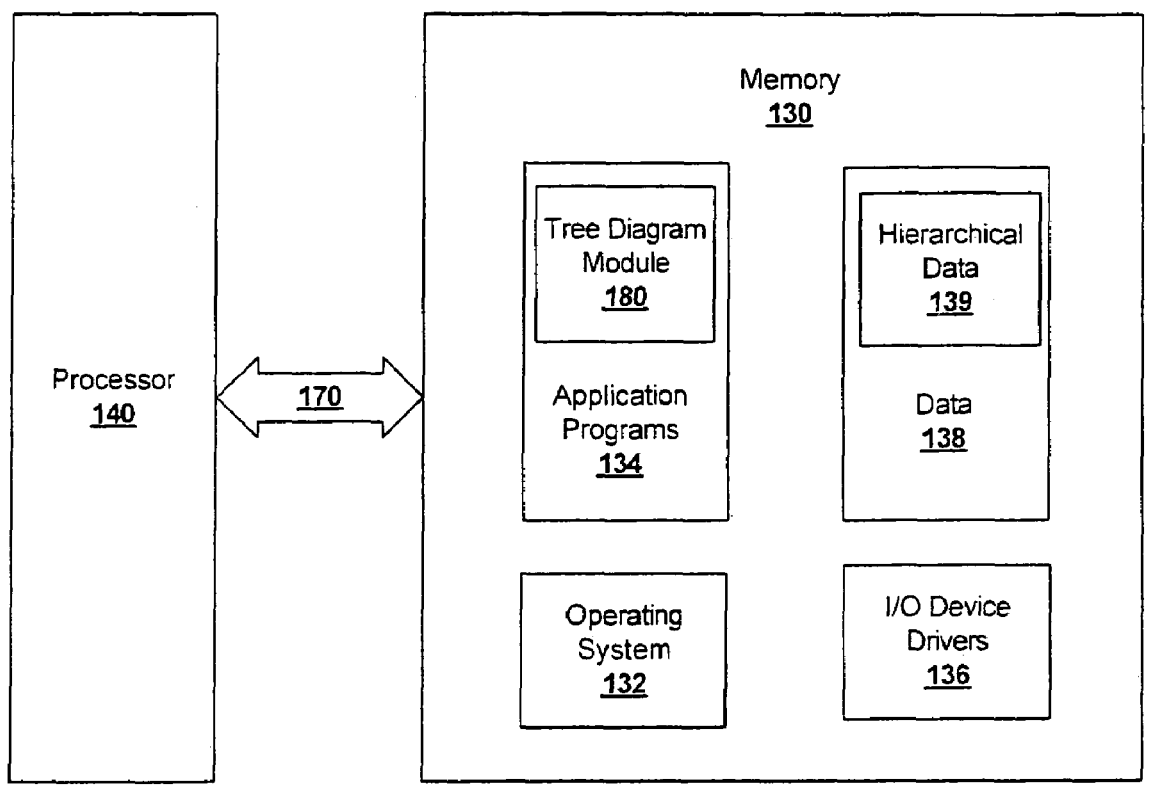
FIG. 3 is a more detailed block diagram of aspects of a data processing system that may be used in some embodiments of the present invention.

FIG. 3 is a block diagram of data processing systems that illustrates systems, methods, and computer program products in accordance with some embodiments of the present invention. The processor 140 communicates with the memory 130 via an address/data bus 170. The processor 140 can be any commercially available or custom microprocessor. The memory 130 is representative of the overall hierarchy of memory devices, and may contain the software and data used to implement the functionality of the data processing system 100. The memory 130 can include, but is not limited to, the following types of devices: cache, ROM, PROM, EPROM, EEPROM, flash memory, SRAM, and DRAM.

As shown in FIG. 3, the memory 130 may include several categories of software and data used in the data processing system 100: the operating system 132; the application programs 134; the input/output (I/O) device drivers 136; and the data 138, which may include at least one hierarchical data set 139. The hierarchical data set 139 may include elements that have embedded hierarchical data. As will be appreciated by those of skill in the art, the operating system 132 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 136 typically include software routines accessed through the operating system 132 by the application programs 134 to communicate with devices such as the I/O data port(s) 160 and certain memory 130 components. The application programs 134 are illustrative of the programs that implement the various features of the data processing system 100 and preferably include at least one application that supports operations according to embodiments of the present invention. Finally, the data 138 represents the static and dynamic data used by the application programs 134, the operating system 132, the I/O device drivers 136, and other software programs that may reside in the memory 130.

As is further seen in FIG. 3, the application programs 134 may include a tree diagram module 180. The tree diagram module 180 may carry out the operations described herein for displaying in a tree diagram hierarchical data sets that, for example, include elements that have embedded hierarchical data. While the present invention is illustrated, for example, with reference to the tree diagram module 180 being an application program in FIG. 3, as will be appreciated by those of skill in the art, other configurations may also be utilized while still benefiting from the teachings of the present invention. For example, the tree diagram module 180 may also be incorporated into the operating system 132, the I/O device drivers 138 or other such logical division of the data processing system 100. Thus, the present invention should not be construed as limited to the configuration of FIG. 3, but is intended to encompass any configuration capable of carrying out the operations described herein.

Figure 4:
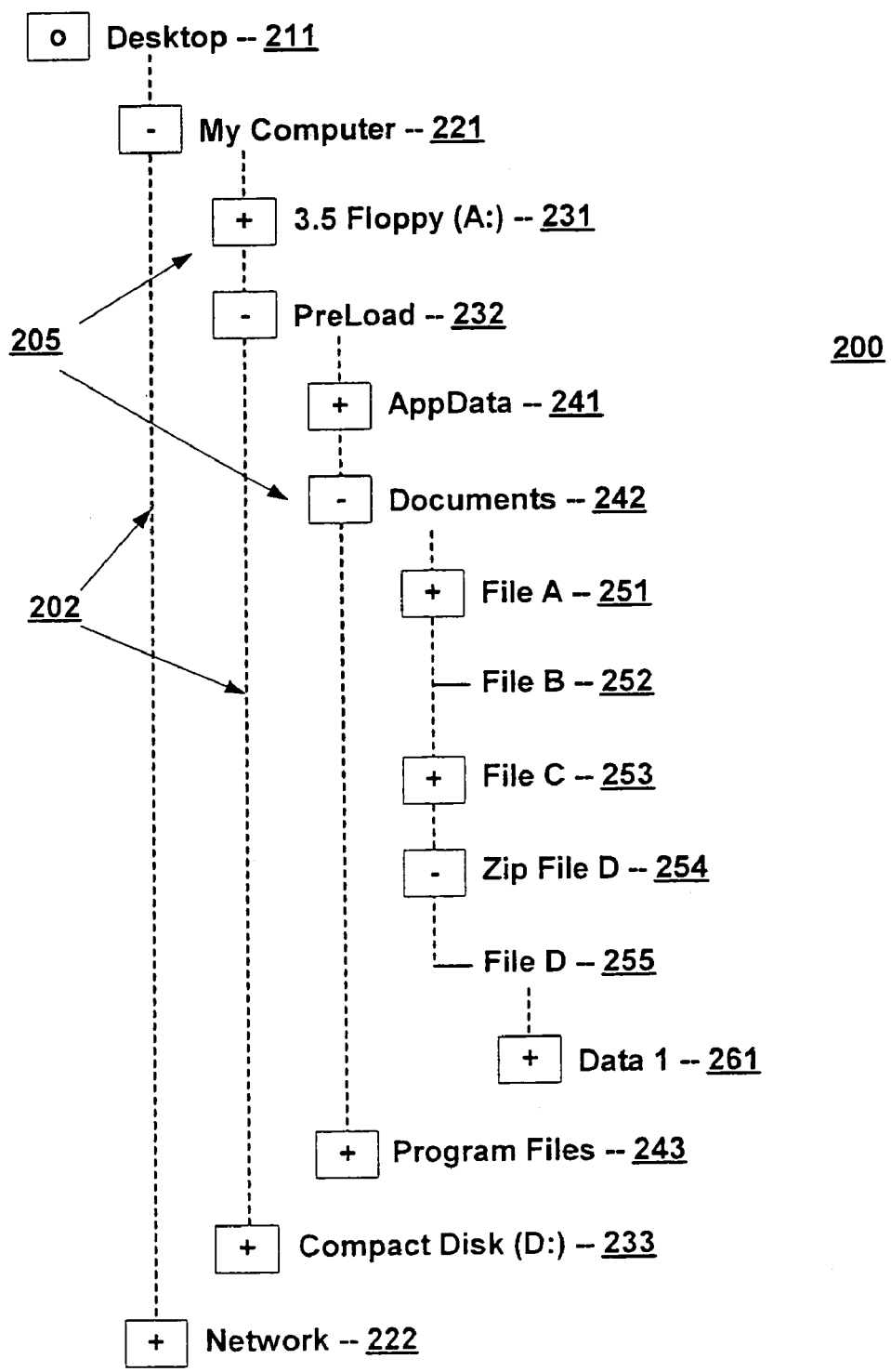
FIG. 4 depicts a display of data on a tree diagram graphical user interface.

As will be understood by those of skill in the art, a tree diagram refers to a display of data in which the data is arranged in a series of levels. FIG. 4 depicts an exemplary tree diagram 200 in which the hierarchical data displayed in the tree diagram 200 is arranged in a series of vertically oriented levels 210, 220, 230, 240, 250, 260, where each vertically oriented level is physically offset from the other vertically oriented levels along the horizontal axis. Each of the vertically oriented levels includes one or more entries 211, 221-222, 231-233, 241-243, 251-255, 261 that are referred to herein as "nodes" of the tree diagram 200. Each such node typically contains data from the set of hierarchical data, such as for example, the data "3.5 Floppy (A:)" that is displayed at node 231. The nodes 211, 221-222, 231-233, 241-243, 251-255, 261 are arranged in the tree diagram 200 to graphically display their hierarchical relationship with other nodes in the tree diagram 200. The nodes may also include other information, such as, for example, the "folder" icons depicted in the conventional tree diagram of FIG. 1.

In the tree diagram 200 of FIG. 4, level 210 is the lowest level of the tree diagram, and level 260 is the highest level. Conventionally, the lowest level is referred to as the "root" of the tree diagram or the "root level." The root level of a tree diagram typically, but not necessarily, includes only a single node. In FIG. 4, the root node (node 211) is positioned on the left-most side of the tree diagram 200, although other orientations may be used. As shown in FIG. 4, the nodes in the higher levels 220, 230, 240, 250, 260 branch out (either directly or indirectly) from the node 211 at root level 210, which is why these diagrams are referred to as "tree" diagrams. A node Y is said to directly "branch out" from another node X if node Y (1) is in the next highest level of the tree diagram and (2) depends directly from node X. Thus, for example, nodes 251-255 directly branch out from node 242. A node Z indirectly branches out from another node X if node Z is part of a series of nodes at different levels, where (1) each node in the series directly branches out from another node in the series, (2) the series includes a node that directly branches out from node X and (3) node Z does not directly branch out from node X. Thus, for example, node 261 indirectly branches out from node 242.

A node or group of nodes that directly branch out from a node at a lower level of the tree diagram are referred to as "child" or "children" nodes. The node from which the child/children node branch out of is referred to as the "parent" node. For example, in FIG. 4 node 232 would be the parent of nodes 241, 242 and 243 and nodes 241, 242 and 243 would be the children of node 232. Similarly, the nodes that branch out, either directly or indirectly, from a node X at a lower level are collectively referred to as the "descendant" nodes of node X. By way of example, in FIG. 4 nodes 241, 242, 243, 251, 252, 253, 254, 255 and 261 are the descendants of node 232. Likewise, a first node is referred to as an "ancestor" node of a second node if the second node branches out, either directly or indirectly, from the first node. Thus, for example, in FIG. 4 nodes 211, 221, and 232 would all be ancestor nodes of node 243.

As is also shown in FIG. 4, the tree diagram may include "level indicators" that help visually convey to a user of the graphical user interface the nodes that fall within a particular level of the tree diagram. In FIG. 4, these level indicators are implemented as vertical dotted lines 202 that visually delineate each of the vertically oriented levels 210, 220, 230, 240, 250, 260. It will be appreciated that a wide variety of level indicators may be used such as, for example, providing a vertical bar on the tree diagram of a distinct (or alternating) color, shade or pattern that is aligned with the nodes of each of the levels 210, 220, 230, 240, 250, 260. It will also be appreciated that the level indicators 202 may be omitted altogether.

Conventional tree diagram graphical user interfaces also typically provide capabilities to "collapse" or "expand" nodes in the tree diagram to vary the amount of information from the hierarchical data set that is actually displayed on the electronic display. Typically, the collapse and expand functions are implemented via an "expansion handle." Herein, the term "expansion handle" is used to refer to any indicia displayed on the electronic display that a user may select to cause a node in the tree diagram to be expanded or collapsed.

In embodiments of the present invention, the tree diagrams may include expansion handles that are implemented using conventional box icons such as the box icons 205 (the box icons each have a "+" sign or a "−" sign within the box) depicted in the tree diagram of FIG. 4 (note that to simplify the drawing only a few of the box icons include the label 205). These box icons 205 may be selected by a user to cause the tree diagram graphical user interface to expand or collapse the tree diagram at the node that the box icon 205 is associated with. By way of example, in the tree diagram of FIG. 4, a user may use a pointing device such as a mouse or a stylus to select one of the box icons labeled 205. If a mouse is used as the pointing device, this may be accomplished, for example, by using the mouse to move an arrow on the electronic display screen over the box icon 205 and then single clicking the left button on the mouse. The selection of the box icon 205 causes the associated node to toggle between its expanded and collapsed states.

A node is considered to be "collapsed" when all the descendants of that node are hidden. In the exemplary tree diagram of FIG. 4, a "+" sign appears in the box icon 205 of a collapsed node (see, e.g., node 231). By selecting the box icon 205 with the "+" sign a user may initiate the expand function such that the tree diagram displays the children of the node at issue. Once the node has been expanded so that at least all the nodes in the next highest level are displayed, the "+" is replaced by a "−" in the box icon 205. Likewise, a "−" sign appears in the box icon 205 associated with a node that is at least partially collapsed (see, e.g., node 254). This will occur when at least the children nodes of the node at issue are displayed. By selecting one of the box icons 205 with the "−" sign a user may initiate the collapse function for the node that the box icon is associated with such that all the descendant nodes (not just the children nodes) of the node at issue are hidden from view. After the node has been collapsed the "−" is replaced by a "+" in the box icon 205. When this occurs, the node at issue may be referred to as being in a "fully collapsed" state. Functionality may also be provided that allows the user to "fully expand" a node (i.e., display all the descendant nodes of the node) in a single step, such as by, for example, using the mouse to move the arrow on the electronic display screen over the box icon 205 for the node and then double clicking the left button on the mouse.

Embodiments of the present invention provide methods, systems and computer program products for displaying hierarchical data in which elements of the hierarchical data set include embedded hierarchical data in a tree diagram graphical user display. In certain embodiments of the present invention, this may be accomplished by rendering different parts of the tree diagram using different orientations.

For instance, the tree diagram depicted in FIG. 4 is rendered in a vertical orientation. By "vertical orientation" (or "vertically oriented") it is meant that the nodes that comprise a particular level of the tree diagram are substantially aligned along a vertical axis. Tree diagrams may also be rendered in a "horizontal orientation" (also referred to as "horizontally oriented") in which the nodes that comprise a particular level of the tree diagram are substantially aligned along a horizontal axis. Other orientations are also possible such as, for example, a diagonal orientation. Embodiments of the present invention render the tree diagram in two or more orientations in order to more accurately and intuitively portray to a viewer the relationships between the different types of hierarchical data that are displayed on the tree diagram graphical user interface.

Figure 5:
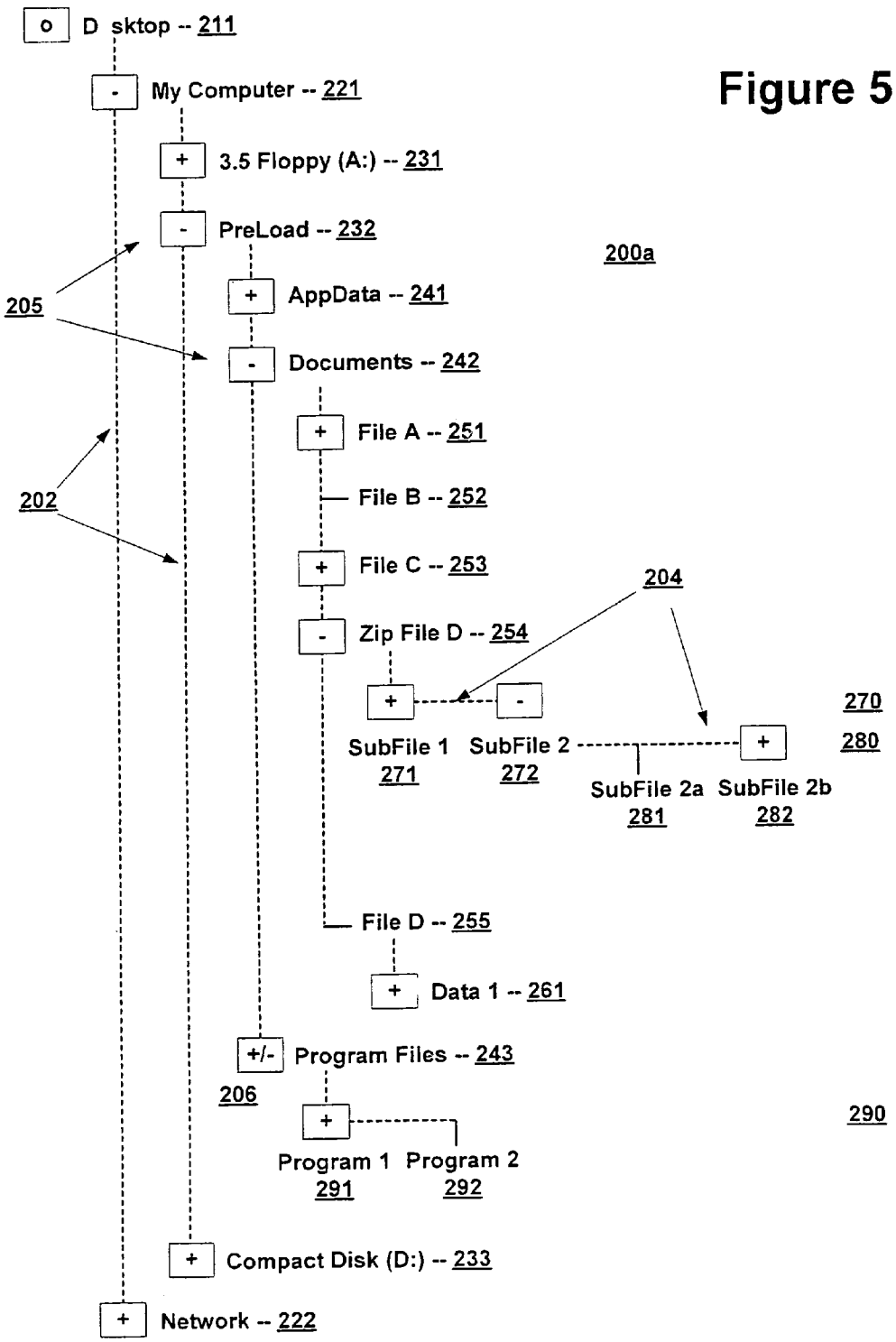
FIG. 5 depicts a tree diagram graphical user interface according to the embodiments of the present invention.

FIG. 5 depicts an exemplary tree diagram graphical user interface 200a according to embodiments of the present invention. The tree diagram 200a of FIG. 5 is similar to the tree diagram 200 of FIG. 4, and thus like reference numerals are used for like elements in the two figures (as well as in FIGS. 6-8). However, the tree diagram 200a includes a plurality of horizontally oriented levels 270, 280, 290. In the tree diagram 200a of FIG. 5, each of the horizontally oriented levels is disposed between adjacent nodes in one of the vertically oriented levels 210, 220, 230, 240, 250, 260. Thus, for example, horizontally oriented levels 270, 280 are disposed between adjacent nodes 254, 255 of vertically oriented level 250. Referring back to FIG. 4, it is seen that node 254 contains a "Zip File D" 254. As will be appreciated by persons of skill in the art, zip files refer to a computer data file that is, typically, a concatenation of a group of files. The group of files may be stored in the zip file in its own directory structure that may be hierarchical in nature. Thus, a zip file is one common example of an element of a hierarchical data set that may itself include embedded hierarchical data.

In the example of FIG. 5, the Zip File D contained at node 254 comprises a plurality of files, four of which (the files at nodes 271-272, 281-282) are depicted in FIG. 5. As shown in FIG. 5, these four files are stored in a hierarchical manner with two files displayed at nodes 271, 272 in a level 270 of the tree diagram that branches out directly from the "sub-root" node 254. Two additional files are displayed in nodes 281, 282 that branch out from node 272. FIG. 5 indicates that Zip File D includes additional files as well, as indicated by the "+" expansion handles 205 associated with nodes 271 and 282, but these additional files are not displayed as nodes 271 and 282 are collapsed in this particular rendering of the tree diagram 200*a*.

As also shown in FIG. 5, the tree diagram 200*a* may include horizontal level indicators 204 that help visually convey to a user of the graphical user interface the nodes that fall within the horizontally oriented levels 270, 280, 290. In FIG. 5, these horizontal level indicators are implemented as horizontal dashed lines 204 that visually delineate each of the horizontally oriented levels 270, 280, 290. In embodiments of the present invention, the horizontal level indicators 204 may be visually distinct from the vertical level indicators 202 to more clearly portray to a viewer the nodes that are part of each type of level. This may be done, for example, using one type of line (e.g., dashed) for the horizontal level indicators 204 and another type of line (e.g., dotted) for the vertical level indicators 202, by using different colors, etc. It will also be appreciated that a wide variety of other horizontal level indicators 204 may be used and that the horizontal level indicators 204 may be omitted altogether.

As is also shown in FIG. 5, the nodes in the horizontally oriented levels 270, 280, 290 may have expansion handles. These expansion handles permit a user of the tree diagram graphical user interface 200*a* to expand and collapse the nodes in the horizontally oriented levels in the same manner that the nodes in the vertically oriented levels of the tree diagram 200*a* are expanded and collapsed. Adjacent node 243 a modified expansion handle 206 is also depicted that includes both a "+" and a "−" sign within the box (a "+/−" symbol). Such a modified expansion handle 206 may be provided because a node in the tree diagram 200a may contain both descendant nodes in higher vertically oriented levels of the diagram as well as descendant nodes in higher horizontally oriented levels of the diagram. The "+" sign in expansion handle 206 depicts the state (i.e., collapsed) of node 243 with respect to nodes in higher vertically oriented levels that branch out from node 243 and the "−" sign in expansion handle 206 depicts the state (i.e., expanded) of node 243 with respect to nodes in higher horizontally oriented levels (level 290) that branch out from node 243. The symbols displayed in modified expansion handle 206 would vary depending upon the collapsed/expanded state of the node (node 243) that it is associated with. For example, if node 243 were expanded to display its children nodes in the higher vertically oriented levels the symbol displayed in modified expansion handle 206 would change to a "−/−" symbol. Likewise, if nodes 271-272 and 281-282 were collapsed into node 243 the symbol displayed in modified expansion handle 206 would change to a "+/+" symbol. Finally, if node 243 is expanded to display the children in higher vertically oriented levels and the children in higher horizontally oriented levels are collapsed into node 243, a "−/+" symbol would be displayed in the modified box icon 206.

The modified expansion handle 206 could be implemented to work in a variety of different ways. In one exemplary implementation, a user may use a mouse to move to collapse/expand the modified expansion handle 206. In this particular embodiment, single clicking the left button on the mouse will cause the nodes branching out from node 243 in the next highest vertically oriented level to toggle between their collapsed and expanded states, while double clicking the left mouse button would cause the nodes branching out from node 243 in the next highest horizontally oriented level (i.e., nodes 271, 272) to toggle between their collapsed and expanded states. In alternative embodiments of the present invention, the nodes branching out from node 243 in the next highest horizontally oriented level (i.e., nodes 271, 272) could be expanded or collapsed by pointing to node 243 with a mouse arrow and clicking the right mouse button. Thus, the modified expansion handles of the present invention allow a user to selectively choose which type of levels (i.e., horizontally oriented or vertically oriented) are expanded/collapsed. Numerous other implementations of the modified expansion handles 206 are possible.

Figure 6:
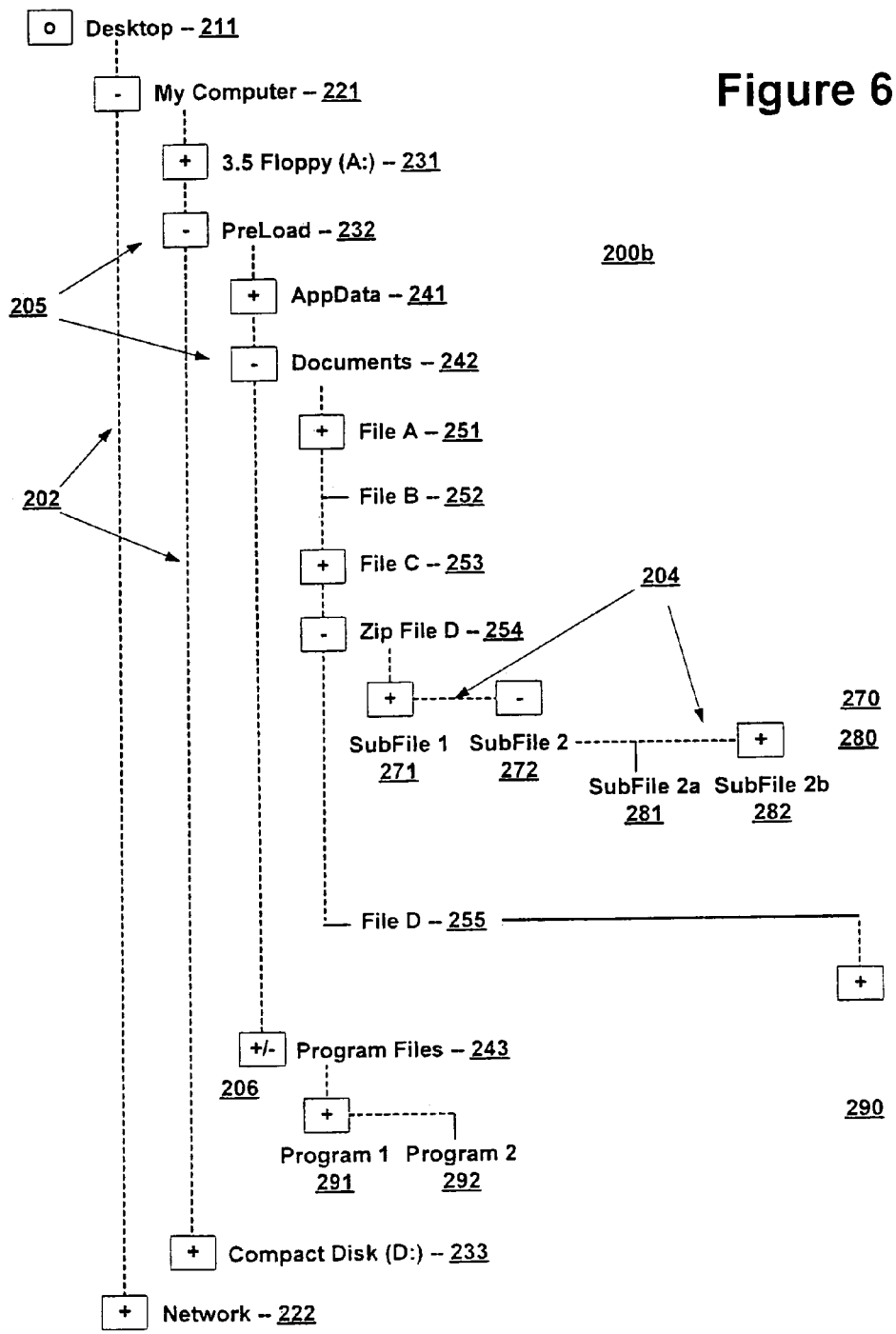
FIG. 6 depicts a tree diagram graphical user interface according to further embodiments of the present invention.

FIG. 6 depicts a tree diagram graphical user interface 200*b* according to further embodiments of the present invention. In the embodiment of FIG. 6, the horizontally oriented levels are rendered on the display in a manner such that the nodes of the horizontally oriented levels are not aligned with the vertically oriented levels. Thus, in FIG. 6, the vertically oriented level 260 has been shifted laterally to the right (as compared to FIG. 5) so that the horizontally oriented levels are visually distinct from the vertically oriented levels. Such a configuration may be desired to further highlight which nodes contain the data from the hierarchical data set and which nodes contain the embedded hierarchical data.

Figure 7:
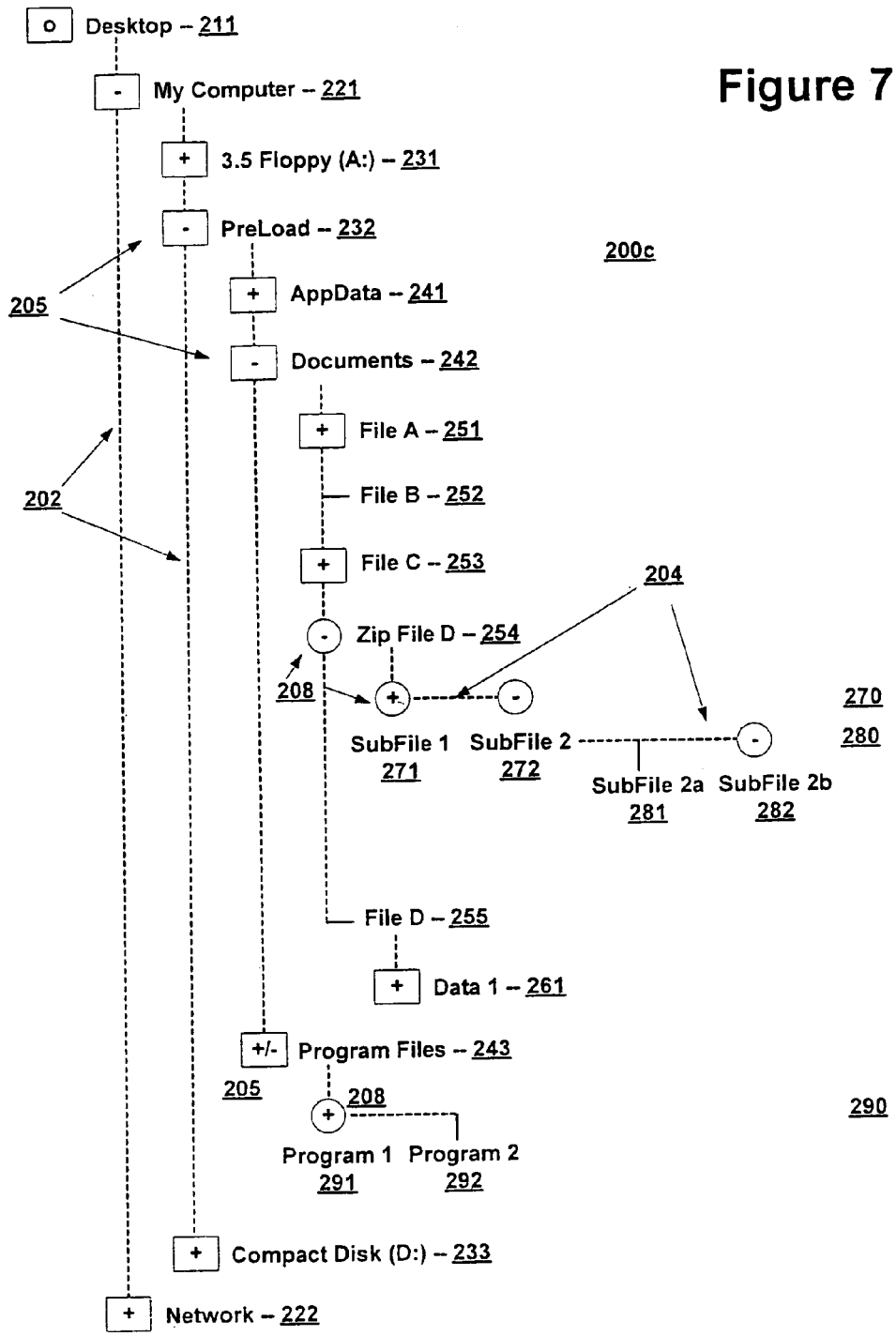
FIG. 7 depicts a tree diagram graphical user interface according to still further embodiments of the present invention.

FIG. 7 depicts a tree diagram 200*c* according to further embodiments of the present invention. In the tree diagram 200*c* of FIG. 7, two different types of expansion handles are provided—expansion handles 205 that are used to expand/collapse the vertically oriented levels of the diagram and expansion handles 208 that are used to expand/collapse the horizontally oriented levels of the diagram. Nodes in the tree diagram 200*c* that have nodes branching out of them in both higher vertically oriented and horizontally oriented levels may have one of each type of expansion handle 205, 208 associated with the node (see, e.g., node 243). As shown in FIG. 7, the two different types of expansion handles 205, 208 may have different shapes, patterns, coloring or other variations in appearance so that the user may more easily distinguish between the two different types of expansion handles (in FIG. 7 the expansion handles 205 are square-shaped while the expansion handles 208 are circular).

Figure 8:
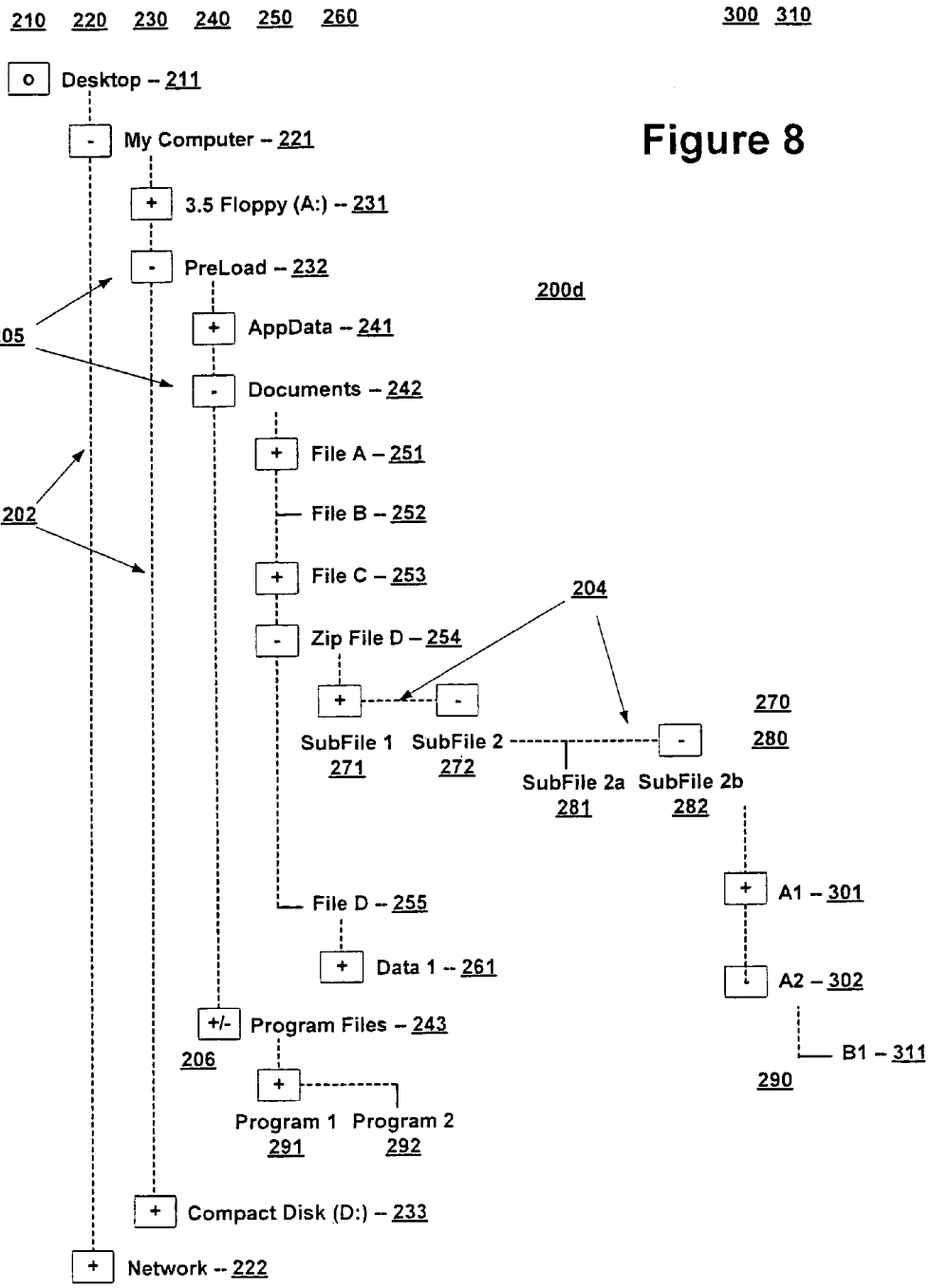
FIG. 8 depicts a tree diagram graphical user interface according to additional embodiments of the present invention.

In further embodiments of the present invention, tree diagram graphical user interfaces are provided that may be used to display hierarchical data sets that have more than one additional layer of embedded hierarchical data. FIG. 8 depicts an exemplary tree diagram 200*d* that illustrates this aspect of the present invention. The tree diagram 200*d* depicted in FIG. 8 is identical to the tree diagram 200 of FIG. 5 except that in the tree diagram of FIG. 8 the node 282 has been fully expanded to display a hierarchy of data that was embedded in the "SubFile 2b" represented at node 282. As shown in FIG. 8, the embedded data in node 282 is displayed in two additional vertically oriented levels 300, 310. By reverting back to the vertical orientation the user is again provided a clear indicator that the nodes that branch out from node 282 depict doubly-embedded hierarchical data. In the event that elements of the hierarchical data set included data at levels that are higher than level 260 (no such levels are depicted in FIGS. 4-8), those higher levels could, optionally, be shifted laterally so that they were displayed to the right of levels 300, 310. Such a configuration helps to distinguish for the user nodes that are elements from hierarchical data set from nodes that represent doubly-embedded hierarchical data (since both such types of nodes are displayed in a vertical orientation in FIG. 8). It will also be appreciated that the concept illustrated in the tree diagram of FIG. 8 may be extended, for example, by using additional horizontally oriented levels to display triply-embedded hierarchical data.

As will be appreciated by persons of skill in the art, embodiments of the "multi-dimensional" tree diagram graphical user interfaces disclosed herein may be constructed using elements such as HTML that do not require an advanced or specialized viewer. Additionally, the tree diagram graphical user interfaces may provide, in many instances, a more efficient use of the available space on an electronic display screen. In particular, hierarchical data sets, more often than not, use a large amount of vertical space while using only a relatively small amount of horizontal space on the display screen. The multi-dimensional tree diagrams provided by embodiments of the present invention can, in many instances, decrease the amount of vertical screen display space required.

Figure 9:
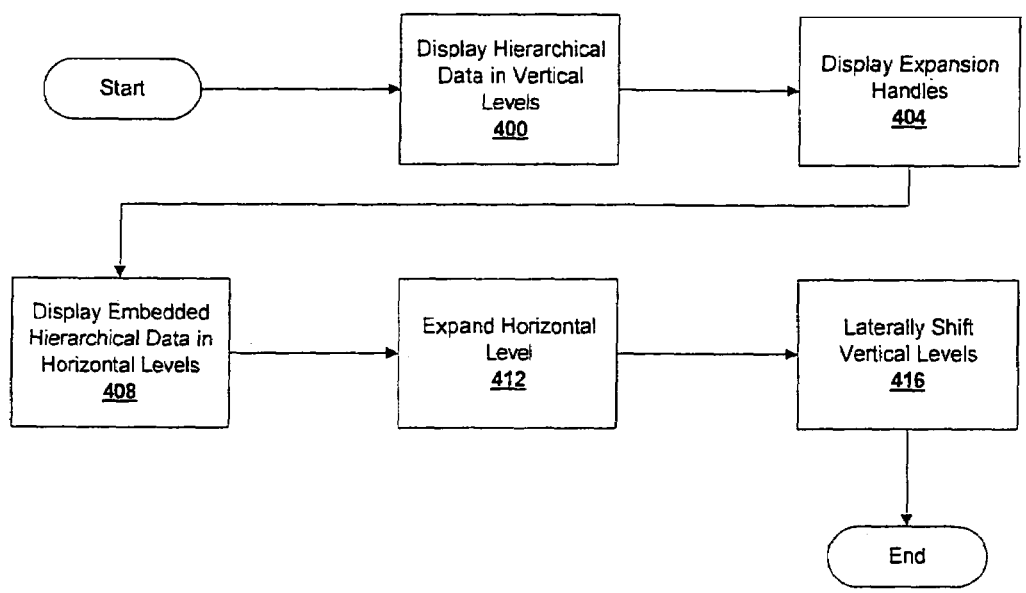
FIG. 9 is a flowchart depicting operations according to some embodiments of the present invention.

FIG. 9 is a flowchart illustration that depict operations for displaying in a tree diagram graphical user interface a hierarchical data set that includes elements that have embedded hierarchical data pursuant to embodiments of the present invention. As shown in FIG. 9, in one such embodiment the data in the hierarchical data set is displayed on the electronic display in the vertically oriented levels of a tree diagram (box 400). One or more expansion handles may also be displayed adjacent nodes in the vertically oriented levels that have other nodes branching out of them (box 404). Hierarchical data that is embedded in elements of the hierarchical data set may also be displayed in the tree diagram in nodes contained in one or more horizontally oriented levels of the tree diagram (box 408). One or more of the nodes (in either a vertically oriented level or a horizontally oriented level) that has nodes that are in a horizontally oriented level collapsed into it may be expanded to display its children nodes in the horizontally oriented level (box 412). One or more vertically oriented levels may also be shifted laterally in response to, or in conjunction with, the expansion of the nodes in the horizontally oriented level (box 416).

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method for displaying a set of hierarchical data on an electronic display, the method comprising:

displaying the set of hierarchical data on the electronic display in a tree diagram having a first portion and a second portion;

wherein the first portion of the tree diagram has a plurality of vertically oriented levels; and wherein the second portion of the tree diagram has a plurality of horizontally oriented levels, wherein the second portion of the tree diagram is disposed between two adjacent levels of the plurality of vertically oriented levels.

2. The method of claim 1, wherein at least one of the plurality of horizontally oriented levels has a first node that is aligned with one of the plurality of vertically oriented levels and a second node that is aligned with a different one of the plurality of vertically oriented levels.

3. The method of claim 1, wherein the plurality of vertically oriented levels in the first portion of the tree diagram and the plurality of horizontally oriented levels in the second portion of the tree diagram have one or more nodes at each level, and further comprising displaying on the electronic display an expansion handle icon having a first configuration adjacent at least one of the nodes in the first portion of the tree diagram and displaying on the electronic display an expansion handle icon having a second configuration adjacent at least one of the other nodes in the first portion of the tree diagram.

4. The method of claim 1, further comprising displaying on the electronic display a plurality of level indicators of a first type that denote respective of the plurality of vertically oriented levels and a plurality of level indicators of a second type that is different from the first type that denote respective of the plurality of horizontally oriented levels.

5. The method of claim 1, wherein the plurality of vertically oriented levels and the plurality of horizontally oriented levels have one or more nodes at each level, and wherein the method further comprises:

expanding a first of the one or more nodes in a first of the plurality of vertically oriented levels to display at least one of the one or more nodes in a first of the plurality of horizontally oriented levels; and laterally shifting the displayed plurality of vertically oriented levels that are higher levels than the first of the plurality of vertically oriented levels.

6. The method of claim 1, wherein the plurality of vertically oriented levels and the plurality of horizontally oriented levels have one or more nodes at each level, and wherein each of the plurality of horizontally oriented levels branch out directly or indirectly from respective ones of the one or more nodes in the vertically oriented levels.

7. The method of claim 6, wherein the tree diagram includes a third portion that has a plurality of second vertically oriented levels, and wherein each of the plurality of second vertically oriented levels branch out directly or indirectly from respective ones of a group of nodes that comprise part of the second portion of the tree diagram.

8. The method of claim 1, wherein each vertically oriented level of the tree diagram comprises a vertically oriented group of nodes that are physically offset from other vertically oriented levels in the tree diagram, wherein each horizontally oriented level of the tree diagram comprises a horizontally oriented group of nodes that are physically offset from other horizontally oriented levels in the tree diagram, and wherein each node contains hierarchical data.

9. The method of claim 8, wherein the hierarchical data comprises text data.

10. A method for displaying a set of hierarchical data on an electronic display, the method comprising:

displaying the set of hierarchical data on the electronic display in a tree diagram having a first portion and a second portion;

wherein the first portion of the tree diagram has a plurality of vertically oriented levels;

wherein the second portion of the tree diagram has a plurality of horizontally oriented levels; and wherein at least one element in the set of hierarchical data includes a set of embedded hierarchical data.

11. The method of claim 10, wherein the set of hierarchical data is displayed in the first portion of the tree diagram, and wherein the set of embedded hierarchical data is displayed in the second portion of the tree diagram.

12. The method of claim 11, wherein at least one element in the set of embedded hierarchical data includes a second set of embedded hierarchical data, and wherein the second set of embedded hierarchical data is displayed in a third portion of the tree diagram.

13. A method for displaying a set of hierarchical data in which elements of the set of hierarchical data include embedded hierarchical data on an electronic display, the method comprising:

displaying at least part of the set of hierarchical data on the electronic display in a first plurality of levels that have a first orientation upon which the one or more nodes that comprise the level are substantially aligned; and displaying the embedded hierarchical data embedded in at least one of the elements of the set of hierarchical data on the electronic display in a second plurality of levels that have a second orientation upon which the one or more nodes that comprise the level are substantially aligned;

wherein the second orientation is different than the first orientation.

14. The method of claim 13, wherein the first orientation is a vertical orientation and the second orientation is a horizontal orientation.

15. The method of claim 13, further comprising displaying a second set of hierarchical data that is embedded in an element of the embedded hierarchical data in one or more of the first plurality of levels.

16. A graphical user interface for displaying a set of hierarchical data in which elements of the set of hierarchical data include embedded hierarchical data, comprising:
a tree diagram having a plurality of vertically oriented levels that include one or more nodes;
a plurality of horizontally oriented levels that include one or more nodes, wherein each of the plurality of horizontally oriented levels branch out directly or indirectly from respective of the one or more nodes in the plurality of vertically oriented levels.

17. The graphical user interface of claim 16, further comprising:
a plurality of expansion handles of a first type that are associated with respective of the nodes in the plurality of vertically oriented levels;
a plurality of expansion handles of a second type that is different than the first type that are associated with respective of the nodes in the plurality of vertically oriented levels that contain one of the elements of the set of hierarchical data that includes embedded hierarchical data.

18. The graphical user interface of claim 16, further comprising:
a plurality of level indicators of a first type that denote respective of the plurality of vertically oriented levels; and
a plurality of level indicators of a second type that is different from the first type that denote respective of the plurality of horizontally oriented levels.

19. The graphical user interface of claim 18, wherein the plurality of level indicators of a first type comprise a line of a first color and the plurality of level indicators of a second type comprise a line of a different color.

20. The graphical user interface of claim 16, wherein each of the plurality of horizontally oriented levels is disposed between pairs of adjacent nodes in the plurality of vertically oriented levels.

21. The graphical user interface of claim 16, wherein at least one of the plurality of horizontally oriented levels has a first node that is aligned with one of the plurality of vertically oriented levels and a second node that is aligned with a different one of the plurality of vertically oriented levels.

22. The graphical user interface of claim 16, further comprising a plurality of second vertically oriented levels that branch out directly or indirectly from one or more of the nodes in the plurality of horizontally oriented levels.

23. The graphical user interface of claim 16, further comprising:
a plurality of expansion handles of a first type that are associated with respective of the nodes in the plurality of vertically oriented levels;
a plurality of expansion handles of a second type that is different than the first type that are associated with nodes in the tree diagram from which the nodes in the plurality of horizontally oriented levels branch out from.

24. The graphical user interface of claim 16, further comprising an expansion handle that is associated with a first node in a first of the vertically oriented levels which may be used to expand the first node to display descendant nodes in both one of the plurality of vertically oriented levels and in one of the plurality of horizontally oriented levels.

25. A computer program product for displaying a set of hierarchical data in which elements of the set of hierarchical data include embedded hierarchical data on an electronic display, the method comprising:
a computer readable medium having computer readable program code embodied therein, the computer readable program code comprising:
computer readable program code configured to display at least part of the set of hierarchical data on the electronic display in a first plurality of levels having a first orientation; and
computer readable program code configured to display embedded hierarchical data embedded in at least one of the elements of the set of hierarchical data on the electronic display in a second plurality of levels having a second orientation that is different than the first orientation.

26. A method for displaying a set of hierarchical data on an electronic display, the method comprising:
displaying the set of hierarchical data on the electronic display in a tree diagram having a first portion and a second portion;
wherein the first portion of the tree diagram has a plurality of vertically oriented levels, wherein each of the plurality of vertically oriented levels includes one or more vertically aligned nodes that contain data from the set of hierarchical data; and
wherein the second portion of the tree diagram has a plurality of horizontally oriented levels, wherein each of the plurality of horizontally oriented levels includes one or more horizontally aligned nodes that contain data from the set of hierarchical data.

* * * * *